(12) United States Patent
Oki

(10) Patent No.: US 12,395,597 B2
(45) Date of Patent: Aug. 19, 2025

(54) PRINT BILLING SYSTEM, INFORMATION PROCESSING APPARATUS, CONTROLLING METHOD OF INFORMATION PROCESSING APPARATUS, AND STORAGE MEDIUM

(71) Applicant: CANON KABUSHIKI KAISHA, Tokyo (JP)

(72) Inventor: Mitsuo Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 18/500,264

(22) Filed: Nov. 2, 2023

(65) Prior Publication Data
US 2024/0155066 A1 May 9, 2024

(30) Foreign Application Priority Data
Nov. 4, 2022 (JP) ................................ 2022-176932

(51) Int. Cl.
*H04N 1/34* (2006.01)
*H04N 1/00* (2006.01)

(52) U.S. Cl.
CPC ......... *H04N 1/346* (2013.01); *H04N 1/00204* (2013.01); *H04N 1/00832* (2013.01)

(58) Field of Classification Search
CPC .............. H04N 1/346; H04N 1/00204; H04N 1/00832; H04N 1/344; G06F 3/1203; G06F 3/1273; G06Q 30/0283; G06Q 30/04; G03G 21/02
See application file for complete search history.

(56) References Cited

U.S. PATENT DOCUMENTS

| | | | | |
|---|---|---|---|---|
| 2010/0241543 A1* | 9/2010 | Matsumoto | ........... | G06F 3/1207 358/1.15 |
| 2013/0282503 A1* | 10/2013 | Shiraiwa | ................. | G07F 15/08 705/34 |
| 2015/0248092 A1* | 9/2015 | Takahashi | ............... | G07F 17/42 399/79 |
| 2018/0357685 A1* | 12/2018 | Tanaka | .................... | G06Q 50/04 |
| 2020/0225892 A1* | 7/2020 | Nishino | ................ | G06F 3/1292 |
| 2021/0158427 A1* | 5/2021 | Jobetto | ................. | G06F 3/1273 |
| 2024/0022069 A1* | 1/2024 | Miwa | ...................... | H02J 3/001 |

FOREIGN PATENT DOCUMENTS

JP 2010218337 A 9/2010

* cited by examiner

*Primary Examiner* — Iriana Cruz
(74) *Attorney, Agent, or Firm* — Canon U.S.A., Inc. IP Division

(57) ABSTRACT

In a print billing system that includes an image forming apparatus and an information processing apparatus mutually connected via a network: the image forming apparatus comprises a transmitting unit for transmitting information of usage based amounts respectively concerning a plurality of usage based billing methods having different modes; and the information processing apparatus comprises a storing unit for storing the information of the usage based amount obtained from the image forming apparatus, a calculating unit for calculating billing sums of money of the plurality of usage based billing methods based on the information of the usage based amounts, and a selecting unit configured to select one of the plurality of usage based billing methods based on the billing sum of money of each of the usage based billing methods calculated by the calculating unit.

11 Claims, 6 Drawing Sheets

FIG. 3
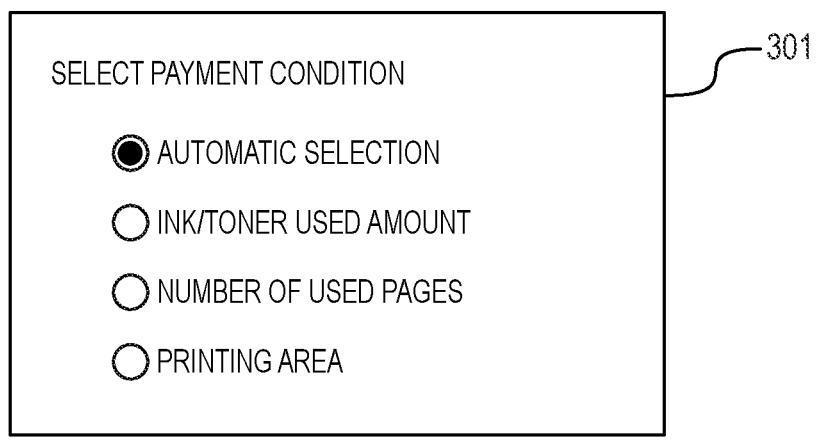
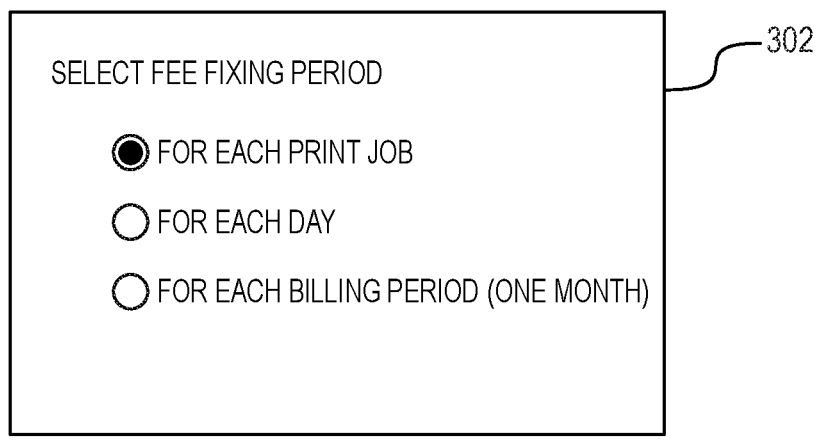

FIG. 4

| CONTRACT CONDITIONS | TOTAL AMOUNTS | TOTAL AMOUNTS (UNITS) | UNIT COSTS | TOTAL SUMS OF MONEY |
|---|---|---|---|---|
| TOTAL INK/TONER AMOUNT | 50 | ml | 1YEN | 1000YEN |
| TOTAL NUMBER OF USED PAGES | 100 | PAGE | 10YEN | 2000YEN |
| TOTAL PRINTING AREA | 10 | cm² | 20YEN | 4000YEN |

401 — 402 (ADDITION FOR EACH PRINT JOB) — 403 — 404 (ADDITION FOR EACH BILLING UNIT PERIOD (JOB OR DAY OR MONTH))

PRINT BILLING SYSTEM, INFORMATION PROCESSING APPARATUS, CONTROLLING METHOD OF INFORMATION PROCESSING APPARATUS, AND STORAGE MEDIUM

BACKGROUND

Field of the Disclosure

The present disclosure relates to a print billing system, an information processing apparatus, a controlling method of the information processing apparatus, and a storage medium storing a program for executing the controlling method.

Description of the Related Art

Conventionally, in a contract model of an image recording apparatus, a contract condition is common in which usage based billing is performed based on a contract, and payment is performed at a billing sum of money calculated based on the usage based billing every certain period in which the billing is fixed. Here, in the contract condition, the billing sum of money is generally calculated based on a usage based amount of one billing target such as the number of total pages printed in a certain period, a total printing area or the like.

Japanese Patent Application Laid-Open No. 2010-218337 discloses an image forming system that defines a billing map for setting billing unit prices according to print job conditions and determines the billing unit price according to the print job condition.

However, a use purpose and a printing condition of the image recording apparatus change even for the same user, and the condition may not be the most advantageous (low-cost) contract condition under a condition fixed to one usage based billing such as the total number of page, the total printing area or the like.

For example, mainly in text-based printing performed in an office or the like, an ink/toner used amount per page is relatively small compared to printing with high density such as photographic printing, graphics printing or the like. For this reason, in the text-based printing, a contract condition in which the ink/toner used amount is used for usage based billing is disadvantageous.

In addition, in a case where printing is often performed for a relatively small paper size such as an L size, a postcard size or the like, the billing sum of money according to the contract condition based on the number of print pages is higher than the billing sum of amount in a case where printing is often performed for a large paper size such as an A3 size, an A2 size or the like. In such a case, the contract condition based on the number of print pages is disadvantageous as the contract condition of usage based billing.

SUMMARY

A print billing system in a present disclosure is the print billing system that includes an image forming apparatus and an information processing apparatus mutually connected via a network, wherein: the image forming apparatus comprises a transmitting unit configured to transmit information of usage based amounts respectively concerning a plurality of usage based billing methods having different modes; and the information processing apparatus comprises a storing unit configured to store the information of the usage based amount obtained from the image forming apparatus, a calculating unit configured to calculate billing sums of money of the plurality of usage based billing methods based on the information of the usage based amounts, and a selecting unit configured to select one of the plurality of usage based billing methods based on the billing sum of money of each of the usage based billing methods calculated by the calculating unit.

Further features of the present disclosure will become apparent from the following description of exemplary embodiments with reference to the attached drawings.

BRIEF DESCRIPTION OF THE DRAWINGS

FIG. 3 is a diagram showing a payment condition selection screen according to one or more aspects of the present disclosure.

FIG. 4 is a diagram showing a billing fee table for each billing condition in the embodiment.

DESCRIPTION OF THE EMBODIMENTS

Figure 1:
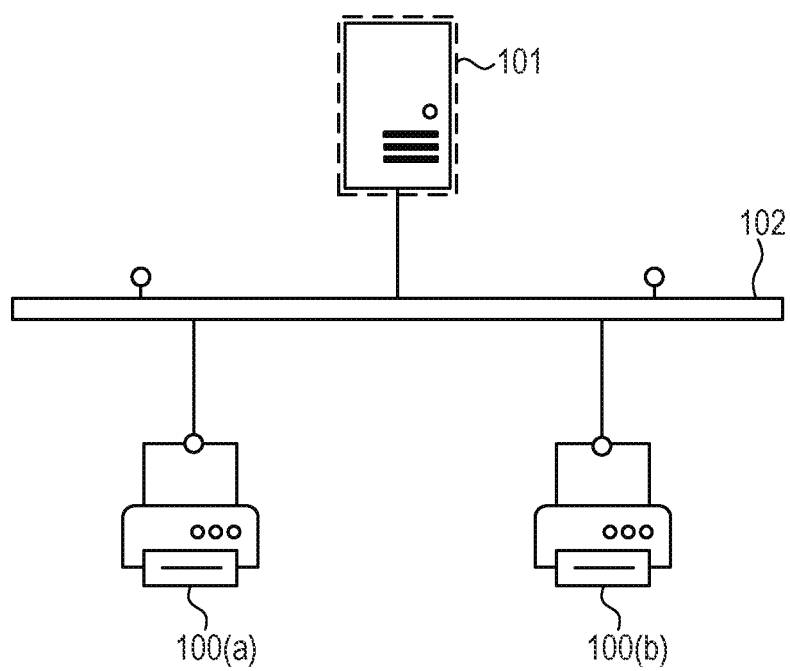
FIG. 1 is a configuration diagram showing a print billing system according to one or more aspects of the present disclosure.

Hereinafter, embodiments of the present disclosure will be described with reference to the accompanying drawings. The following embodiments do not limit the disclosure as in the claims. Although plural features are described in the embodiments, not all of these features are essential to the disclosure, and the plural features may be arbitrarily combined. Further, in the accompanying drawings, the same or similar components are denoted by the same reference numerals, and redundant explanations thereof are omitted.

Embodiment

Hereinafter, an embodiment of the present disclosure will be described.

Configuration of Billing System of Image Forming Apparatus

FIG. 1 is a diagram showing the overall configuration of a print billing system of an image forming apparatus. The print billing system includes a server 101, which is an information processing apparatus for managing billing fees, and a plurality of image forming apparatuses 100(a) and 100(b) (in the following, these apparatuses are represented by a reference numeral "100" collectively) which are connected via a communication network 102.

The server 101 manages a billing sum of money under a contract condition of usage based billing of a billing target for the plurality of image forming apparatuses 100.

Upon completion of the print job, the image forming apparatus 100 calculates a usage based amount of each billing target (an ink/toner used amount, the number of used pages, a printing area) for each job, and transmits the calculated usage based amount to the server 101 being the information processing apparatus.

The server 101 calculates a billing sum of money to a user from total information of the usage based amount of each billing target based on the usage based amount of each job received from each image forming apparatus, and stores the calculated billing sum of money in a nonvolatile storage region on the server.

Configuration of Image Forming Apparatus

Figure 2:
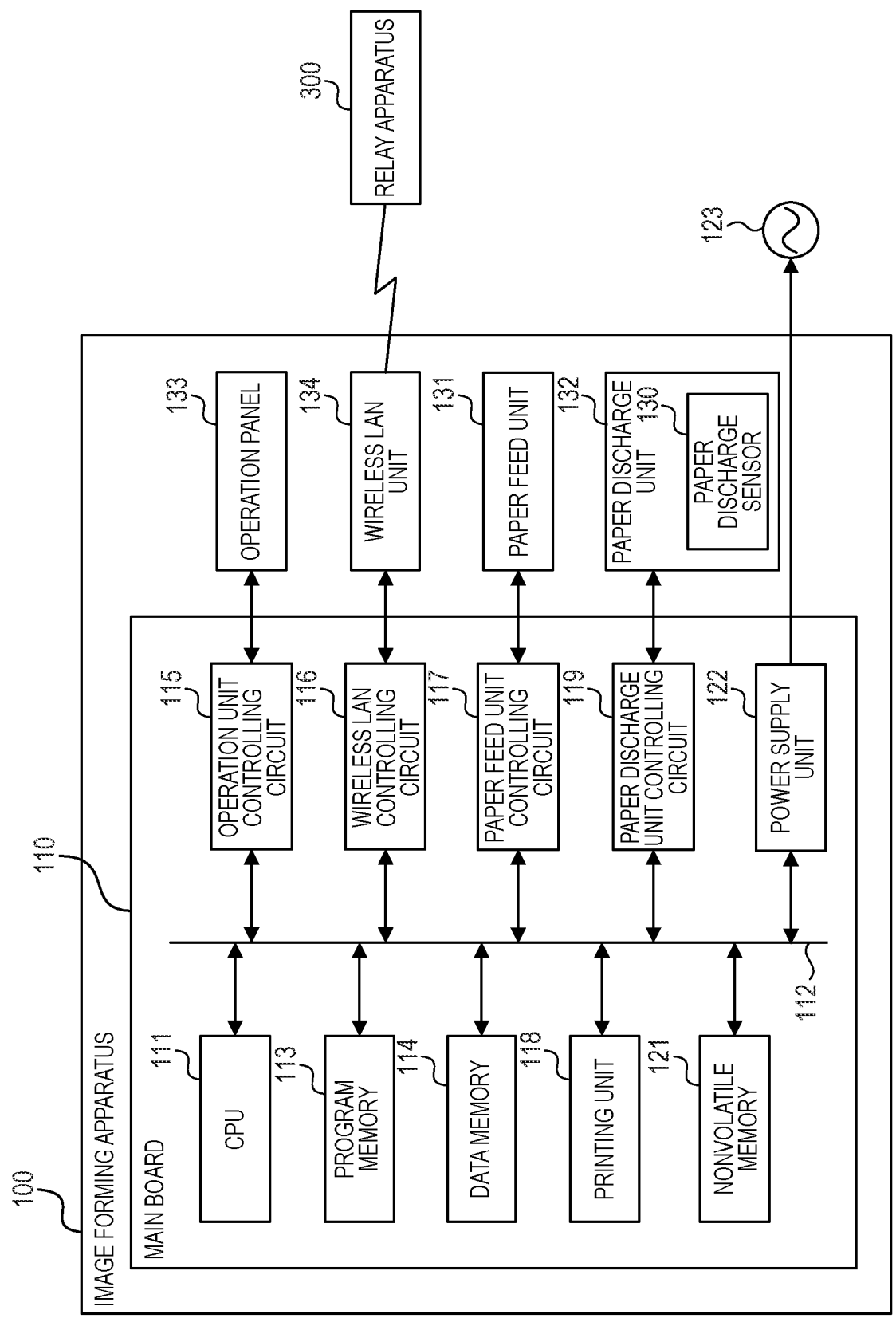
FIG. 2 is a hardware configuration diagram of an image forming apparatus according to one or more aspects of the present disclosure.

FIG. 2 is a diagram showing a configuration of the image forming apparatus according to the present disclosure. The image forming apparatus 100 includes a main board 110 that controls the entire apparatus, a paper feed unit 131, a paper discharge unit 132, an operation panel 133, and a wireless LAN unit 134.

A CPU 111 of a microprocessor disposed in the main board 110 operates in accordance with a control program stored in a program memory 113 of a ROM connected via an internal bus 112, and contents of a data memory 114 of a RAM. The CPU 111 controls an operation unit controlling circuit 115 to display the state of the image forming apparatus 100 on the operation panel 133, to display a function selection menu, and to accept an operation from the user. The CPU 111 can communicate with the server 101 via a relay apparatus 300 and a communication network by controlling the wireless LAN unit 134 via a wireless LAN controlling circuit 116. The CPU 111 controls a paper feed unit controlling circuit 117 to feed paper from the paper feed unit 131 and convey the paper to a printing unit 118. The CPU 111 controls the printing unit 118 to be able to print an image on the paper fed from the paper feed unit 131. The CPU 111 controls a paper discharge unit controlling circuit 119 to take in paper from the printing unit 118 and send the paper to the paper discharge unit 132.

A paper discharge sensor 130 is mounted on the paper discharge unit 132, thereby the state of the paper during paper discharge can be detected. A nonvolatile memory 121 includes a flash memory or the like, and stores and holds data to be stored even after power supply is shut off. A power supply unit 122 is connected to an AC commercial power supply 123, and supplies power to the image forming apparatus 100.

Selection Screen for Billing Payment Condition

FIG. 3 shows an example of a screen for selecting a billing payment condition. The server 101, which is the information processing apparatus, displays a payment condition screen 301 and a fee fixing period selection screen 302 to the user thereby fixing the payment condition, in case of fixing the contract condition of the usage based billing on the print billing system.

In the billing payment condition screen 301, four options of an "automatic selection", an "ink/toner used amount", a "number of used pages" and a "printing area" are displayed as the payment conditions of the usage based billing. Here, the "automatic selection" is an option for selecting the contract condition of the usage based billing which is the most advantageous (inexpensive) for the user among the "ink/toner used amount", the "number of used pages" and the "printing area". On the other hand, each of the "ink/toner used amount", the "number of used pages" and the "printing area" is an option for fixing the contract condition of the usage based billing under the contract condition uniformly fixed in the selected usage based billing.

The fee fixing period selection screen 302 is displayed when the "automatic selection" is selected on the payment condition screen 301. As a selection option of a fee fixing period which is a predetermined period of user selection, any one of an "each print job", an "each day" and an "each billing period (one month)" can be selected. The purpose of this screen is to allow, when the "automatic selection" is selected in the billing payment condition screen 301, the user to select fixing frequencies of the billing sums of money based on the usage based amounts of the ink/toner used amount, the number of used pages and the printing area for fixing the billing sum of money. For example, when the "per print job" which is the shortest period is selected, for each print job, the total usage based amounts in the ink/toner used amount, the number of used pages and the printing area are fixed, and the total sum of money based on the unit price is fixed. In other words, the fee fixing period selection screen 302 is a screen that enables the user to select the fixing period of the advantageous (inexpensive) billing sum of money as the predetermined period of user selection.

Total Amount and Total Sum of Money for Each Billing Condition

FIG. 4 shows an example of a table of a total amount and a total sum of money for each usage based billing target stored in a nonvolatile memory on the server 101.

The storage items include a contract condition 401, a total amount 402, a unit price 403, and a total sum of money 404. The storage items are configured to hold the total amounts for a "total ink/toner amount", a "total number of used pages" and a "total printing area", which are subjects of the usage based billing. Here, the total amount 402 holds a value added for each print job at the end of the print job. Further, the total sum of money 404 holds a value calculated as the total sum of money for each unit of the fee fixing period selected on the fee fixing period selection screen 302 shown in FIG. 3, specifically, for each print job, each day, and each billing period (one month).

Process of Obtaining Total Billing Information

Figure 5:
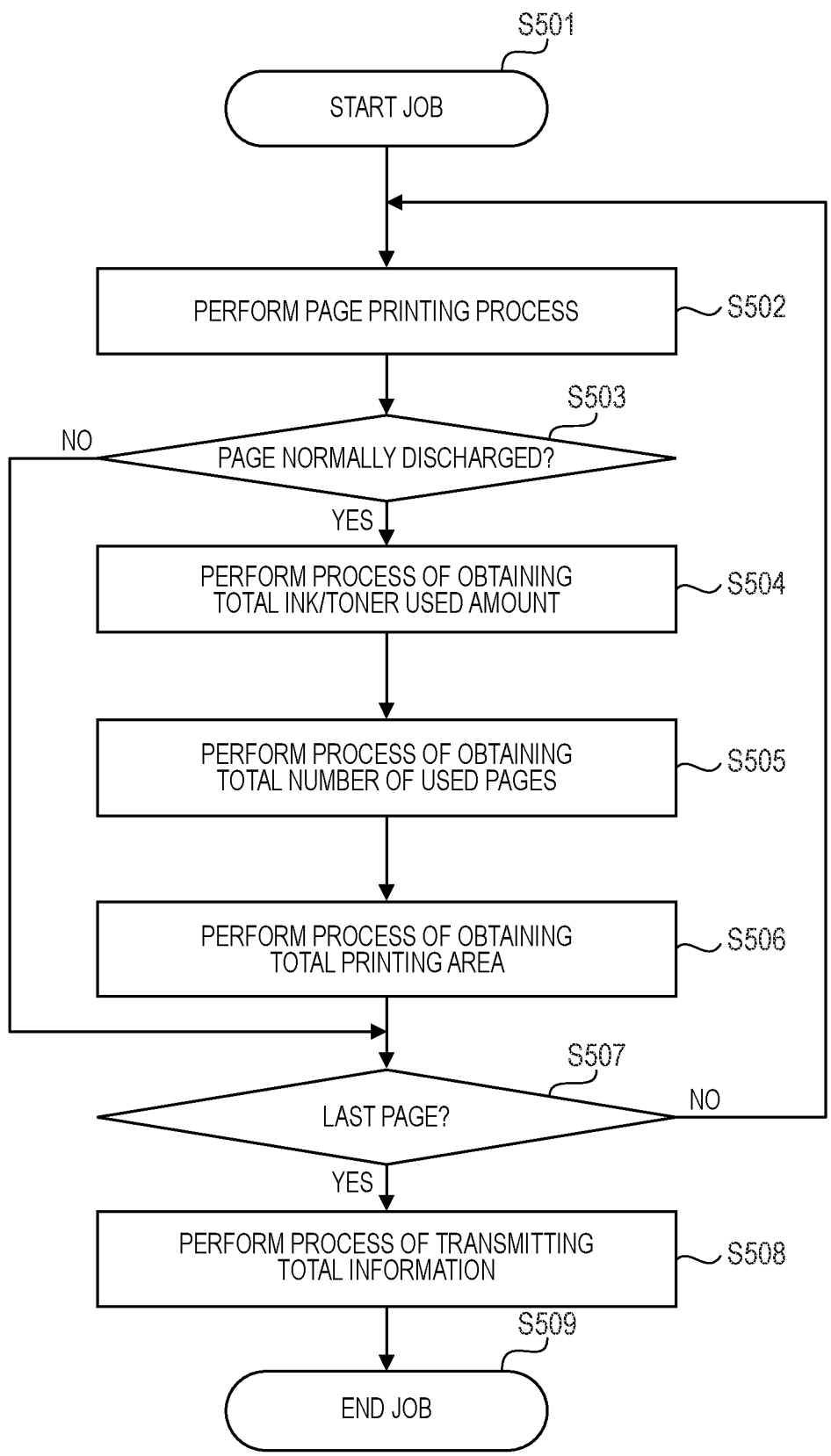
FIG. 5 is a flowchart of a process of obtaining a total usage based amount for each print job according to one or more aspects of the present disclosure.

FIG. 5 is a flowchart showing a process of obtaining total usage based amount information of the usage based billing target when the image forming apparatus 100 executes the print job. The process of this flowchart is developed as a firmware program in the program memory 113 and executed by the CPU 111.

When the print job is input, this process is executed from a start of the print job in S501.

Then, the CPU 111 executes processes from a page printing process in S502 to a process for checking a last page in S507, and executes a loop process for each page in the print job until printing is finished.

The image forming apparatus 100 receives a print job instruction. When the job process is started in S501, in subsequent S502, the CPU 111 performs a process of drawing page drawing information in the print job instruction on a print target in the page printing process.

In S503, the CPU 111 decides whether or not a printed matter printed by the page printing process has been normally discharged to a paper discharge tray. The CPU 111 can detect whether the paper discharge is normally performed based on a signal from the paper discharge sensor 130 of the paper discharge unit 132 via the paper discharge unit controlling circuit 119.

When the paper is normally discharged to the paper discharge tray (YES in S503), the printing of a print target page is completed. For this reason, in order to set the target page as the target of the usage based billing, the CPU 111 advances the process to S504 and subsequent steps, which is the process of obtaining the total information necessary for calculating the billing sum of money. On the other hand, when the CPU 111 decides in S503 that the normal paper discharge is not performed (NO in S503), the CPU 111 decides that the page is not to be billed, skips S504, S505 and S506 which are total adding process steps of each piece of information, and advances the process to S507.

In S504, by a process of obtaining the total ink/toner used amount, the CPU 111 cumulates and adds the amount of ink/toner used in the page, and stores an obtained value in the nonvolatile memory 121 in the image forming apparatus 100.

Similarly, in S505, by a process of obtaining the total number of used pages, the CPU 111 stores, in the nonvolatile memory 121 in the image forming apparatus 100, a value obtained by cumulating and adding the number of page, i.e., "1", used in the page.

Similarly, in S506, by a process of obtaining the total printing area, the CPU 111 calculates the printing area of the target page, and stores a value obtained by cumulating and adding the calculated printing area in the nonvolatile memory 121 in the image forming apparatus 100.

Although the processes of S504, S505 and S506 are processed in series, they may be executed in parallel.

When the CPU 111 decides that the page is the last page in S507 (YES in S507), the process advances to S508. When the CPU 111 does not decide that the page is the last page (NO in S507), the process returns to S502.

In S508, the CPU 111 executes a total information server transmission process. That is, the CPU 111 transmits total information (a cumulative amount of ink/toner, a cumulative amount of used pages, and a cumulative amount of printing area) updated in the target job to the server 101 that manages the usage based billing, and completes the process in units of print process in S508. Thereby, the CPU 111 completes the process of obtaining the total of each piece of information and the transmission to the server 101 only for the pages constituting the print job, which are normally discharged, i.e., pages whose printing is normally completed. Then, the job ends in S509.

Billing Sum of Money Calculation Process

Figure 6:
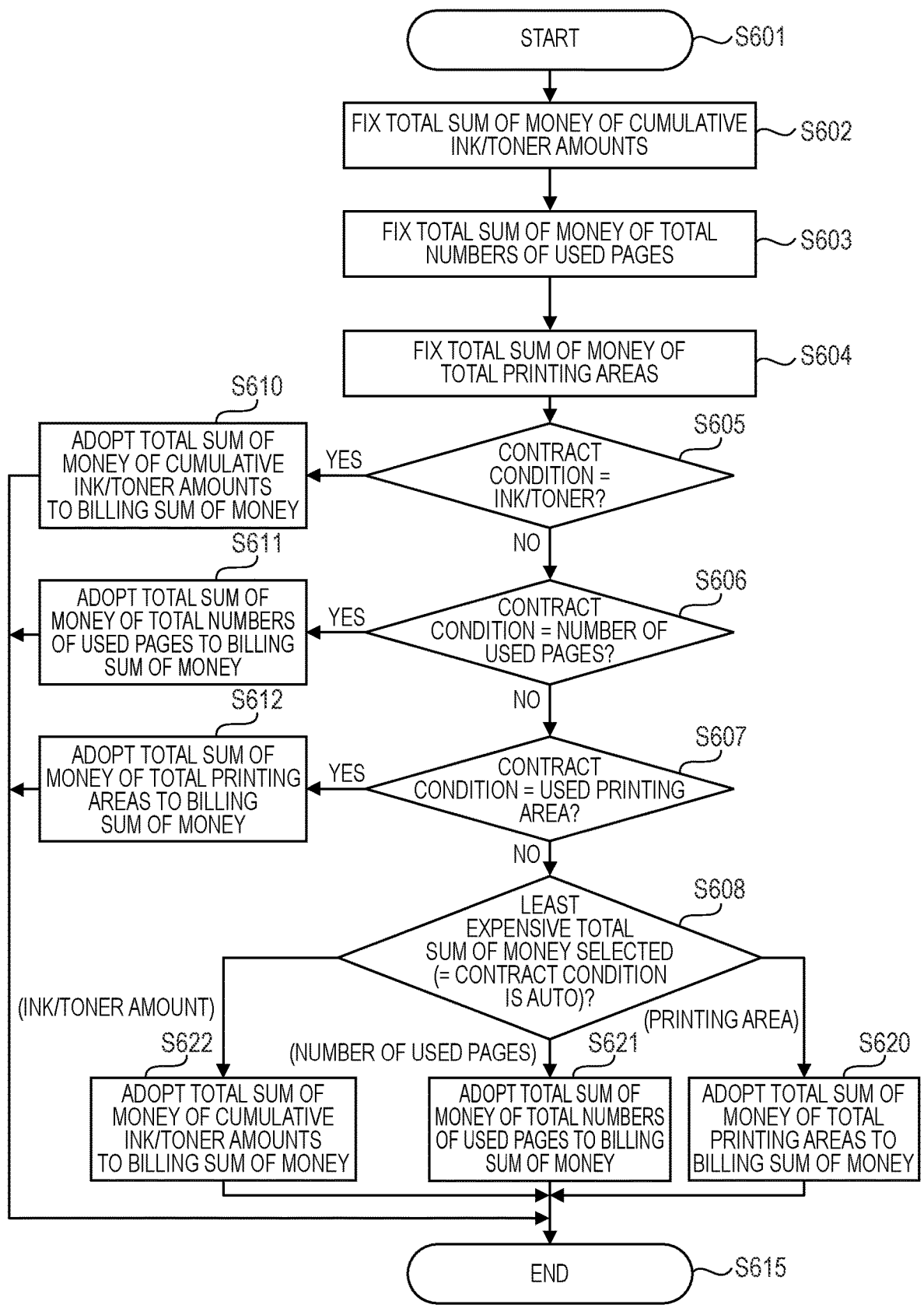
FIG. 6 is a flowchart of a billing sum of money calculation process according to one or more aspects of the present disclosure.

FIG. 6 is a flowchart showing a billing sum of money calculation process of the server 101. The process of this flowchart is executed on the server 101, and is automatically executed for each period selected by the contract user on the fee fixing period selection screen 302. Specifically, the billing sum of money calculation process is executed for each print job, each day, or each month. Note that, in the present embodiment, the description will be given assuming that the fee fixing period is the same as the period up to a due date of bill issuance.

When this process is started in S601, in S602, the server 101 cumulates and adds the information acquired from the image forming apparatus, and calculates and fixes the total sum of money corresponding to the stored information of the cumulative ink/toner amounts. Specifically, among the nonvolatile memory configurations stored in the server 101, the server 101 calculates and fixes the total sum of money 404 based on the total amount 402 added for each print job and the unit price 403 defined in advance as a billing service.

Similarly, in S603, the server 101 calculates and fixes the total sum of money corresponding to the total number of used pages stored by cumulating and adding the acquired information. In S604, the server 101 calculates and fixes the total sum of money of the total printing area stored by cumulating and adding the acquired information. Thus, at the end of S604, all the total sums of money 404 among the nonvolatile memory configurations held in the server 101 are calculated and fixed.

The order of the processes in S602 to S604 may be switched or may be processed in parallel.

In S605, the server 101 confirms whether or not the contract condition selected by a customer is a contract fixed on usage based amount basis of the ink/toner amount.

When the contract condition is the contract fixed on the usage based amount basis of the ink/toner amount (YES in S605), the server 101 advances the process to S610, and adopts the total sum of money based on the total ink/toner amount as the billing sum of money. More specifically, the server 101 fixes, among the nonvolatile memory configurations held on the server 101, the total sum of money 404 in which the contract condition 401 is the "total ink/toner amount" as the billing sum of money, and ends the process (S615).

When the contract condition is not the contract fixed on the usage based amount basis of the ink/toner amount (NO in S605), the server 101 advances the process to S606.

In S606, the server 101 confirms whether or not the contract condition selected by the customer is a contract fixed on usage based amount basis of the number of used pages.

When the contract condition is the contract fixed on the usage based amount basis of the number of used pages (YES in S606), the server 101 advances the process to S611, and adopts the number of used pages as the billing sum of money. More specifically, the server 101 fixes, among the nonvolatile memory configuration held on the server 101, the total sum of money 404 in which the contract condition 401 is the "total number of used pages" as the billing sum of money, and ends the process (S615).

When the contract condition is not the contract fixed on the usage based amount basis of the number of used pages (NO in S606), the server 101 advances the process to S607.

In S607, the server 101 confirms whether or not the contract condition selected by the customer is a contract fixed on usage based amount basis of the used printing area.

When the contract condition is the contract fixed on the usage based amount basis of the used printing area (YES in S607), the server 101 advances the process to S612, and adopts the used printing area as the billing sum of money. More specifically, the server 101 fixes, among the nonvolatile memory configurations held on the server 101, the total sum of money 404 in which the contract condition 401 is the "total printing area" as the billing sum of money, and then ends the process (S615).

When the contract condition is not the contract fixed on the usage based amount basis of the used printing area (NO in S607), the server 101 advances the process to S608. The order of the decision processes in S605 to S607 may be switched. These processes need not be executed in series. It is sufficient that the process advances to S610, S611 and S612 respectively when the contract conditions match in S605, S606 and S607, and the process advances to S608 when none of the contract conditions match.

In S608, the server 101 decides, as the contract condition of the user, the "automatic selection", i.e., the contract condition whose billing sum of money is the lowest. In subsequent S620, S621 and S622, the server 101 fixes the billing sum of money of the contract condition that results in the least expensive billing sum of money. More specifically, the server 101 compares the total sum of money 404 of each contract condition among the nonvolatile memory configuration held on the server 101, selects the contract condition that results in the least expensive billing sum of money, fixes the total sum of money as the billing sum of money, and then ends the process (S615).

As the end process, the server 101 initializes the total amount of the acquired information for a next fee fixing period.

In this flowchart, the process until the billing sum of money is fixed is described. However, in practice, there may be a case where an interval (e.g., in units of one month) of the due date of bill issuance of the billing service is different from the fee fixing period fixed by the contract user on the fee fixing period selection screen 302. In this case, the total billing fee fixed in the processes of this flowchart may be automatically changed so as to be obtained up to the interval (e.g., in units of one month) of the due date of the bill issuance.

By performing the control as described above, even if the purpose of use or the print condition changes after the billing contract, the user can fix the billing sum of money on the billing condition whose condition is most advantageous.

Besides or in addition to the configuration described in the embodiment above, the following configuration can also be adopted.

The billing system may be configured such that all the configuration components are arranged in a single image forming apparatus without separating the server and the plural image forming apparatuses from others.

In this example, the contract condition that can be selected by the user is the "automatic selection", or either the fixed "ink/toner usage", the fixed "number of used pages" or the fixed "printing area". However, the contract condition may be configured to be only the "automatic selection" or may be only the fixed items.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-176932, filed Nov. 4, 2022, which is hereby incorporated by reference herein in its entirety.

What is claimed is:

1. A print billing system that includes an image forming apparatus and an information processing apparatus mutually connected via a network, wherein
the image forming apparatus comprises:
at least one memory and at least one processor which function as:
a transmitting unit configured to transmit information of usage based amounts respectively concerning a plurality of usage based billing methods having different modes, and
the information processing apparatus comprises:
at least one memory and at least one processor which function as:
a storing unit configured to store the information of the usage based amount obtained from the image forming apparatus;
a calculating unit configured to concurrently calculate billing sums of money of the plurality of usage based billing methods based on the same information of the usage based amounts; and
a selecting unit configured to select one of the plurality of usage based billing methods without requiring further user input based on a comparison of the billing sum of money calculated for each of the usage based billing methods.

2. The print billing system according to claim 1, wherein the information of the usage based amount includes a number of used pages, an ink/toner used amount and/or a printing area.

3. The print billing system according to claim 1, wherein the storing unit is configured to store the obtained information of the usage based amount as total information obtained by cumulating the information of the usage based amount over a predetermined period.

4. The print billing system according to claim 3, wherein the predetermined period is either per job, per day or per month.

5. The print billing system according to claim 1, wherein the selecting unit is configured to select, in a case where the usage based billing method is designated by a user, the usage based billing method designated by the user.

6. The print billing system according to claim 1, wherein the billing sum of money calculated by the calculating unit is added until a due date of bill issuance.

7. The print billing system according to claim 1, wherein the selecting unit is configured to select, from among the plurality of usage based billing methods, the usage based billing method in which the calculated billing sum of money is least expensive.

8. The print billing system according to claim 1, wherein the transmitting unit is configured to transmit the information of the usage based amount for each print job.

9. An information processing apparatus in a print billing system that includes an image forming apparatus and the information processing apparatus mutually connected via a network, comprising:
at least one memory and at least one processor which function as:
a storing unit configured to store information of a usage based amount obtained from the image forming apparatus each time a print job is executed;
a calculating unit configured to concurrently calculate billing sums of money of the plurality of usage based billing methods based on the same information of the usage based amounts; and a selecting unit configured to select one of the plurality of usage based billing methods without requiring further user input based on a comparison of the billing sum of money calculated for each of the usage based billing methods.

10. A controlling method of an information processing apparatus in a print billing system that includes an image forming apparatus and the information processing apparatus mutually connected via a network, the controlling method comprising:

storing information of a usage based amount obtained from the image forming apparatus each time a print job is executed;

calculating, concurrently, billing sums of money of a plurality of usage based billing methods based on the same information of the usage based amounts; and selecting one of the plurality of usage based billing methods without requiring further user input based on a comparison of the calculated billing sum of money calculated for each of the usage based billing methods.

11. A non-transitory computer readable storage medium storing a program that causes a computer to execute a controlling method of an information processing apparatus in a print billing system that includes an image forming apparatus and the information processing apparatus mutually connected via a network, the controlling method comprising:

storing information of a usage based amount obtained from the image forming apparatus each time a print job is executed;

calculating, concurrently, billing sums of money of a plurality of usage based billing methods based on the same information of the usage based amounts; and selecting one of the plurality of usage based billing methods without requiring further user input based on a comparison of the calculated billing sum of money calculated for each of the usage based billing methods.

* * * * *